Nov. 3, 1942.　　　　C. S. WILLIAMS　　　　2,300,999
ELECTROMAGNETIC INSPECTION SYSTEM
Filed Oct. 30, 1940　　　2 Sheets—Sheet 1
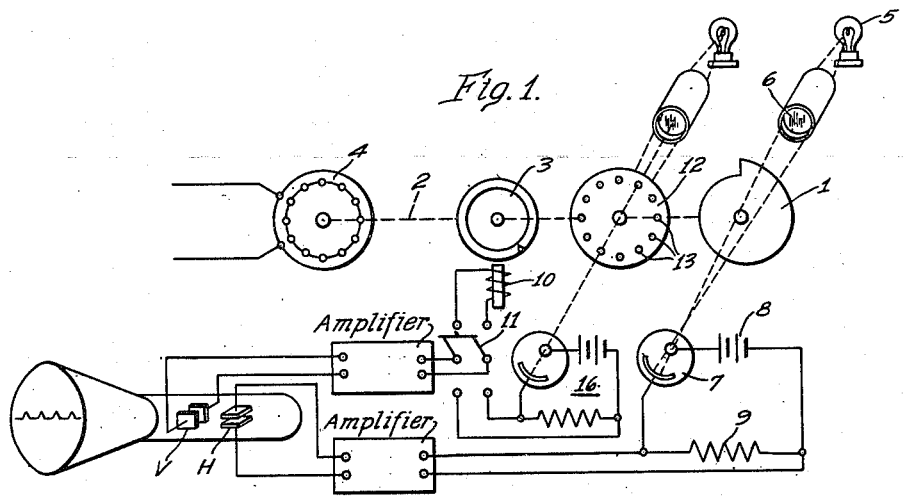
Fig. 1.
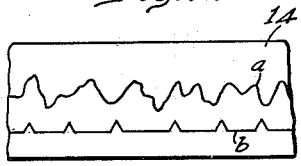
Fig. 2.
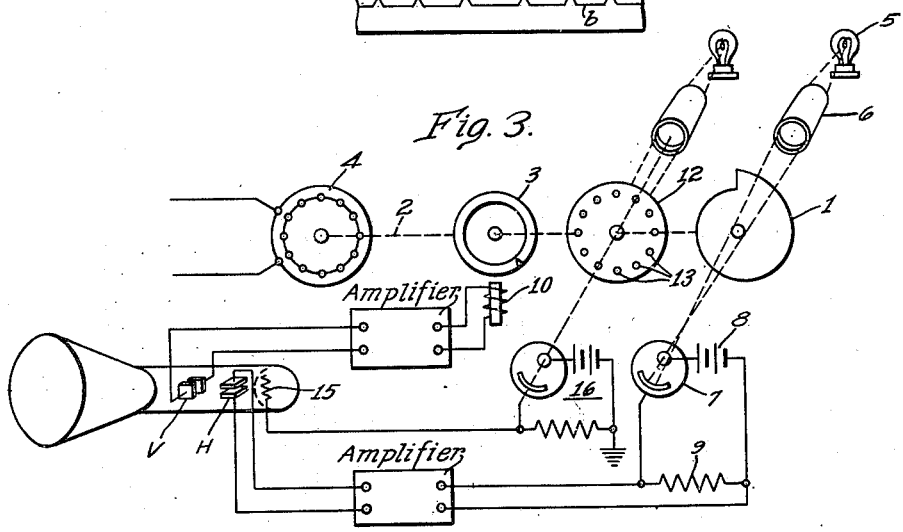
Fig. 3.
Fig. 4.
WITNESSES:
C. J. Weller.
Wm. J. Ruano
INVENTOR
Clifton S. Williams.
BY
Paul E. Friedemann
ATTORNEY Patented Nov. 3, 1942

2,300,999

UNITED STATES PATENT OFFICE 2,300,999

ELECTROMAGNETIC INSPECTION SYSTEM

Clifton S. Williams, Forest Hills, Pa., assignor to Westinghouse Electric & Manufacturing Company, East Pittsburgh, Pa., a corporation of Pennsylvania Application October 30, 1940, Serial No. 363,472

10 Claims. (Cl. 175—183)

My invention relates to an inspection system and, in particular, to one involving a cathode ray indicating device which system is particularly useful for magnetic detection of flaws in a rotatable test piece or for similar detection of variable quantities in a test piece.

In the method of detecting defects in magnetizable objects as disclosed in an earlier filed patent application of Porter H. Brace and Clifton S. Williams, Serial No. 238,600, filed November 3, 1938, and entitled "Electromagnetic testing system," it is often desirable to accurately locate the position of a defect on a piece being inspected. In the device disclosed in said earlier filed application, the cathode-ray oscilloscope acting as the detector of defects, has incorporated within itself a so-called "linear sweep" circuit which provides a nominally linear time base which is applied to the oscilloscope deflection plates, thus providing horizontal displacement of the oscilloscope beam at the same time that the characteristics of the piece being inspected are applied to the vertical deflection plates, thus producing the trace characteristic of the piece being inspected. In the device mentioned, the horizontal sweep is correlated with the test piece as it rotates, by an impulse taken from the rotating shaft once each revolution of the test piece. This impulse serves to initiate the sweep, but has no further control until the revolution has been completed. This, then, means that the relationship between position (horizontal) on the trace and position on the piece being tested is definite at only one point, the relationship at all other points being dependent on the control setting, linearity and stability of the sweep circuit.

An object of my invention is to provide a method of continuously controlling the horizontal movement of the oscilloscope beam thus removing the dependence upon the factors just mentioned with the attendant uncertainties.

Another object of the invention is to provide a cathode ray indicating device which will either visibly indicate or record on a cathode ray tube screen, a film or the like, the variations of magnetic intensity around the periphery of a rotatable test piece together with an index curve which together with the characteristic curve will denote the exact angular position of a magnetic flaw and the magnetic intensity of such flaw.

Other objects and advantages will become more apparent from a study of the following specification when considered with the accompanying drawings, in which:

Figure 1 is a schematic showing of an electromagnetic testing device embodying the principles of my invention;

Fig. 2 indicates either a visual or printed record of a pair of curves obtained by the system shown in Fig. 1;

Fig. 3 is a modified form of my invention;

Fig. 4 shows a characteristic curve obtainable by the system shown in Fig. 3.

Figure 5:
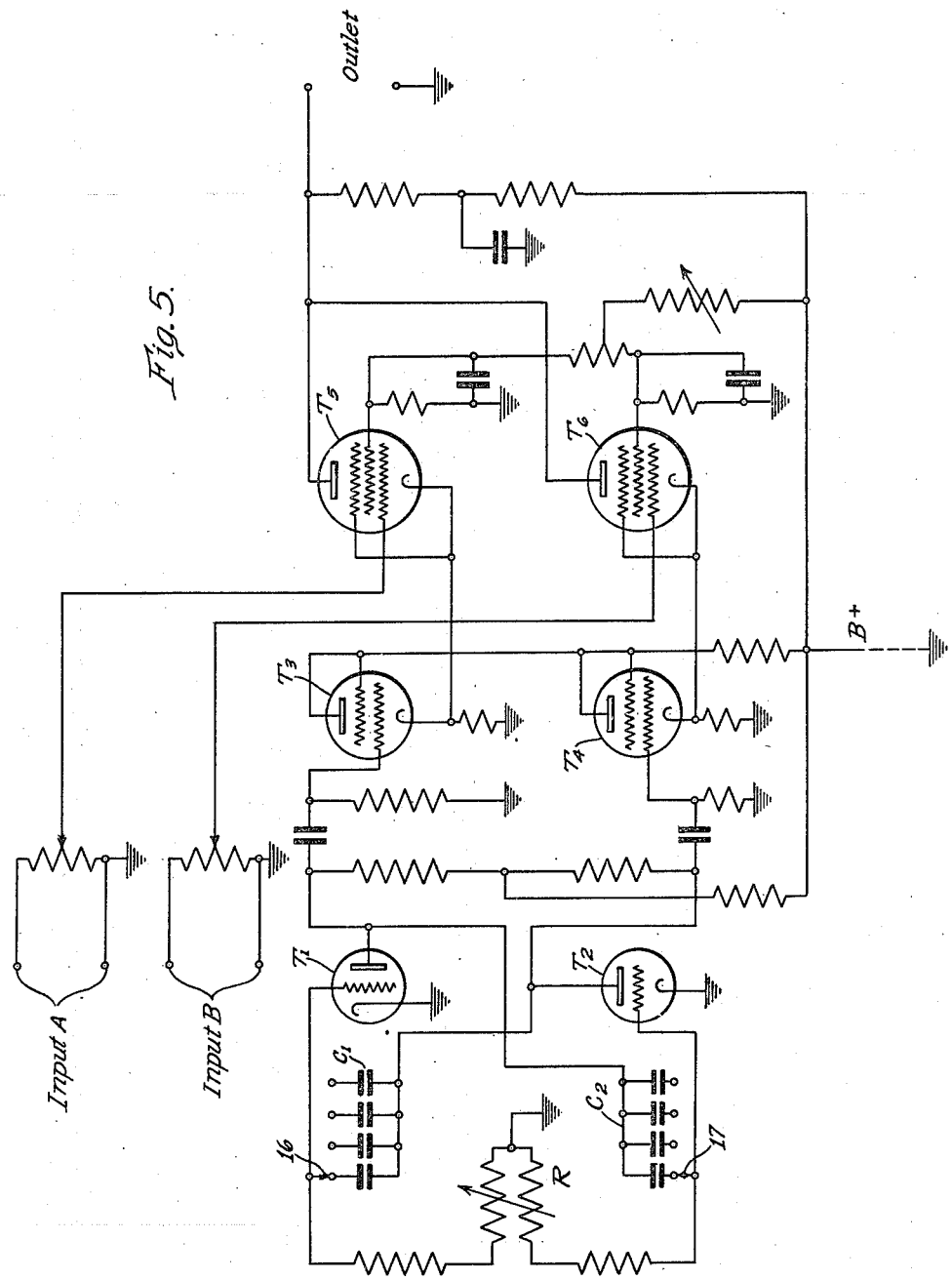
Fig. 5 is a schematic showing of an electronic switch which can be substituted for switch 11 in Fig. 1.

Referring to Figure 1, numeral 1 denotes a cam shaped disc rotating on the shaft 2 (shown dotted) on which is mounted a test piece 3 being inspected and which is mechanically coupled to a driving motor 4. Numeral 5 denotes a light source sending light through the lens 6 (or system of lenses) to fall on the active area of a photocell 7 in quantities which depend upon the angular position of the disc 1. The components of this unit are so set up as to have the cam wheel alter the amount of light striking the phototube proportional to its angular movement, thus providing an amount of light falling on the cell which is directly related to angular positions of the piece being inspected, as it is fixed mechanically with respect to the cam.

These quantities of light may then be converted into terms of voltage by a circuit including a battery 8 preferably in the range of 20 to 500 volts and a resistor 9 of a value, preferably between 1 and 100 megohms which voltage is then applied to the horizontal plates H of the oscilloscope either directly or through an amplifier, as shown, thus providing horizontal movement of a beam always controlled by the position of the test shaft.

A detector element 10 which comprises for example, a small core of readily magnetizable material, such as "Hypernik," disposed within a coil, is selectively connected to the vertical plates V of the cathode ray tube through the amplifier by a double throw switch 11. A second photocell system similar to that described is connected to the lower poles of the double throw switch but which includes a disc 12 having preferably holes 13 instead of a cam shaped member, such as 1.

In previous systems it has been assumed generally that a linear change in voltage applied to the deflection plates would produce linear motion of the electron beam across the face of the oscillograph tube but this is not always true as the deflection plates may not have the same separation from side to side and the deflection constant may differ across the tubes or more likely from center to edges. The system illustrated in Fig. 1, can provide simple compensation for these peculiarities, as the shape of the controlling cam can be altered to provide any voltage sequence desired. This compensation could be applied to any other distortion initiated in the system as lack of linearity of the phototube, or of the amplifier, if used.

In Figure 1 the optical system is shown with the photocell 7 not at the point of focus for the light source. This provides a condition where the area of phototube element receiving light changes with position of the cam controller. It could be changed so as to place the photocell at the point of focus in which case the feature of receiving light would not change but the intensity of illumination will change with cam position.

A curve such as $a$ in Fig. 2 is obtained for test piece 3 by throwing switch 11 so as to include detector 10 in the system.

I have found that benefit accrues from extension of the photocell principle to the interval marking system as disclosed by P. H. Brace in the copending U. S. Patent application Serial No. 358,640 filed September 27, 1940, entitled "Electromagnetic inspection system." This copending application refers to the use of magnetic discontinuities evenly spaced on a wheel mounted on the rotating shaft on which is located the test piece. A pick-up serves to transfer these evenly spaced impulses to the screen in several ways. My photocell system has certain advantages over the magnetic system disclosed in the above copending application in that the "kicks" on the oscilloscope trace are single, one-sided units (see curve $b$ in Fig. 2) instead of the complete cycle set-up with waves below the horizontal axis of curve $b$ by the magnetic system therefore the indexing feature of such curve is more outstanding since the peaks of the "kicks" serve as reference points. Also by varying the hole size, the width of the "kick" is more easily controlled.

A unit such as illustrated in Fig. 1 has been made up and operated. A brass disc 5" outer diameter was mounted on the working shaft and had on a 2" radius 12 holes approximately ⅛" in diameter, 30° apart.

The output from this chopper wheel set-up (when switch 11 is thrown to its lower position), according to the form of my invention shown in Fig. 1, makes an impression on a cathode ray screen in the form of reference curve $b$, Fig. 2. A reference curve $b$ with points has, therefore, been added to the normal trace curve $a$, as shown in Fig. 2 obtainable from test piece 3 and detector coil 10. Both characteristics $a$ and $b$ may be photographed on the same film strip 14. The traces $a$ and $b$ are shown separated for clarity, but may be superimposed so that $b$ may act as a base line for measurement of vertical excursions of $a$. This is done by two separate exposures and has the disadvantage that all factors involved must remain constant over the time required to make two photographic exposures, (about 3–10 seconds). It is possible, however, to substitute for switch 11, a conventional "electron switch" which will alternately switch detector 10 and the photocell associated with disc 12 in the circuit and change from one trace to the other alternately and at short intervals and, through the persistence of the screen, show both curves $a$ and $b$ simultaneously. The switch mentioned is a device known in the art, such as the conventional "Dumont electron switch—Type 185" illustrated in Fig. 5—hence, detailed description of which is deemed unnecessary.

Although the electron switch shown in Fig. 5 forms, in itself, no part of my present invention, it will be briefly described. The electron switch has two pairs of input terminals indicated as "input A" and "input B" which correspond to the upper and lower poles of switch 11 in Fig. 1. The terminals denoted as "output" in Fig. 5 correspond to the amplifier terminals connected to the vertical plates V in Fig. 1. Two sets of condensers $C_1$ and $C_2$ are paralleled by triode tubes $T_2$ and $T_1$ respectively. Either or both of these condensers can be charged from power source B+ if its paralleled triode be non-conductive. Likewise either can be discharged by its associated triode becoming conductive. The circuits of these two sets of associated condensers and triodes are so interconnected as to cause the triode of one to be conductive while the condenser of the other is charging thus the interconnections provide alternate charging and discharging of $C_1$ and $C_2$. In other words, while a blocking potential is placed on the grid of tube $T_2$, condenser $C_1$ is charged from power source B+. After the condenser is fully charged, it will discharge through the anode-cathode circuit of tube $T_2$ and will impress a blocking potential to the grid of tube $T_1$, so as to permit charging of condenser $C_2$. Likewise, as condenser $C_2$ builds up a charge, there will be applied on the grid of tube $T_1$ a blocking potential to make tube $T_1$ non-conductive. In this manner, tubes $T_1$ and $T_2$ become alternately conductive. The rate at which they alternate in conductivity is dependent upon the setting of the variable resistor R; also, of course, on the capacity of condensers $C_1$ and $C_2$ and voltage B+. Tube $T_1$ controls an amplifier tube $T_3$, while tube $T_2$ controls an amplifier tube $T_4$. Tubes $T_3$ and $T_4$ serve to separate the system components as well as amplify. Tube $T_3$ controls an amplifier tube $T_5$, while tube $T_4$ controls an amplifier tube $T_6$. When tube $T_3$ is conductive tube $T_5$ is non-conductive and vice versa. Likewise, when tube $T_4$ is conductive tube $T_6$ is non-conductive and vice versa. In other words, when tube $T_3$ becomes conductive, amplifier tube $T_5$ becomes non-conductive because of the negative potential imposed on the grid of the latter. Likewise, when tube $T_4$ becomes conductive, tube $T_3$ becomes nonconductive. In the final analysis, it will be seen that tubes $T_5$ and $T_6$ become alternately conductive so as to effect switching between input A and input B, so that they are alternately inserted in the circuit. In other words, the electron switch has the effect of first introducing circuit means connected across the "input A" terminals and then the circuit means connected across the "input B" terminals. These circuit means are respectively detector coil 10 and the photo-electric control circuit 16 in Fig. 1, either of which could be connected to "input A" terminals, while the other is connected to "input B" terminals. As stated before, the electron switch per se in Fig. 5 forms no part of my present invention, and is well known in the art, but its combination with the elements shown in Fig. 1 does form part of my present invention. It is understood that other electron switches than that shown in Fig. 5 may be used. The main requirement is that the electronic switching occurs at a high rate of speed, that is, beyond the capability of the human eye so that two phenomena appear to be present at the same time.

A second method of application illustrated in

Fig. 2 is to utilize the characteristics of the cathode ray tube, bringing into service an intensity control grid 15 associated with the electron gun of the cathode ray tube (not shown), and which is capable of controlling the intensity of the electron beam even to shutting it off completely. If the pulses obtained from the chopper wheel set-up be applied in proper phase to this grid, the trace can be blanked out at the point of each "kick" or impulse. This produces a trace with blank spots at the desired intervals which act as the horizontal index line, such as indicated in the curve shown in Fig. 4. Note that each blank spot corresponds to one of the peaks in curve b, Fig. 2. The remainder of the circuit is deemed to be clear from inspection of Fig. 3 in view of the foregoing description.

It will be apparent that the amplifier connected to the horizontal deflecting plates in either Fig. 1 or Fig. 3 may be omitted.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. An inspection device for indicating the occurrence and locations of irregularities on a test piece, comprising means movable relative to said body for translating said irregularities into electrical impulses, means mechanically coupled to the test piece for creating a series of impulses, electrical detecting means including a cathode ray indicating device having two pairs of deflecting elements at right angles to each other and switching means for selectively impressing either of said impulses on a cathode ray screen through one of said pair of deflecting elements, a light source, a photocell, a cam shaped member mechanically coupled to the test piece for varying the effects of said light source on said photocell and means for converting these effects into voltage variations and for applying said voltage variations to the other pair of deflecting elements to form a sweep circuit for said cathode ray indicating device.

2. An inspection device for indicating the occurrence and locations of irregularities on a test piece, comprising means movable relative to said body for translating said irregularities into electrical impulses, means including a photocell, a light source and a disc having a plurality of holes along its periphery for successively interrupting a beam of light from said photocell to said light source which disc is mechanically coupled to the test piece for creating a series of impulses, electrical detecting means including a cathode ray indicating device having two pairs of deflecting elements at right angles to each other and switching means for selectively impressing either of said impulses on a cathode ray screen through one of said pairs of deflecting elements, a light source, a photocell, a cam shaped member mechanically coupled to the test piece for varying the effects of said light source on said photocell and means for converting these effects into voltage variations and for applying said voltage variations to the other pair of deflecting elements to form a sweep circuit for said cathode ray indicating device.

3. An inspection device for indicating the occurrence and locations of irregularities on a test piece, comprising means movable relative to said body for translating said irregularities into electrical impulses, means mechanically coupled to the test piece for creating a series of impulses, electrical detecting means including a cathode ray indicating device having two pairs of deflecting elements at right angles to each other and an electronic switch for periodically and alternately, at short intervals, impressing said impulses on a cathode ray screen through one of said pairs of deflecting elements, a light source, a photocell, a cam shaped member mechanically coupled to the test piece for varying the effects of said light source on said photocell and means for converting these effects into voltage variations and for applying said voltage variations to the other pair of deflecting elements to form a sweep circuit for said cathode ray indicating device.

4. An inspection device for indicating the occurrence and locations of irregularities on a test piece, comprising means movable relative to said body for translating said irregularities into electrical impulses, means including a photocell, a light source and a disc having a plurality of holes along and adjacent its periphery for successively interrupting a beam of light from said photocell to said light source which disc is mechanically coupled to the test piece for creating a series of impulses, electrical detecting means including a cathode ray indicating device having two pairs of deflecting elements at right angles to each other and an electronic switch for periodically and alternately, at short intervals, impressing said impulses on a cathode ray screen through one of said pair of deflecting elements, a light source, a photocell, a cam shaped member mechanically coupled to the test piece for varying the effects of said light source on said photocell and means for converting these effects into voltage variations and for applying said voltage variations to the other pair of deflecting elements to form a sweep circuit for said cathode ray indicating device.

5. An inspection device for indicating the values and locations of magnetic properties of a rotatable test piece comprising means for rotating the test piece, stationary magnetic pick up means for converting changes of magnetic intensity along the periphery of the test piece into electrical impulses, means mechanically coupled to the test piece for creating a series of impulses, electrical detecting means including a cathode ray indicating device having two pairs of deflecting elements at right angles to each other and switching means for selectively impressing either of said impulses on a cathode ray screen through one of said pairs of deflecting elements, a light source, a photocell, a cam shaped member mechanically coupled to the test piece for varying the effects of said light source on said photocell and means for converting these effects into voltage variations and for applying said voltage variations to the other pair of deflecting elements to form a sweep circuit for said cathode ray indicating device.

6. An inspection device for indicating the values and locations of magnetic properties of a rotatable test piece comprising means for rotating the test piece, stationary magnetic pick up means for converting changes of magnetic intensity along the periphery of the test piece into electrical impulses, means including a photocell, a light source and a disc having a plurality of holes along its periphery for successively interrupting a beam of light from said photocell to said light source which disc is mechanically coupled to the test piece for creating a series of impulses, electrical detecting means including a cathode ray indicating device having two pairs of deflecting elements at right angles to each other and switching means for selectively impressing either of said impulses on a cathode ray screen through one of said pairs of deflecting elements, a light source, a photocell, a cam shaped member mechanically coupled to the test piece for varying the amount of light falling from said light source on said photocell and means for converting these light variations into voltage variations and for applying said voltage variations to the other pair of deflecting elements to form a sweep circuit for said cathode ray indicating device.

7. An inspection device for indicating the values and locations of magnetic properties of a rotatable test piece comprising means for rotating the test piece, stationary magnetic pick up means for converting changes of magnetic intensity along the periphery of the test piece into electrical impulses, means mechanically coupled to the test piece for creating a series of impulses, electrical detecting means including a cathode ray indicating device having two pairs of deflecting plates at right angles to each other, namely, vertical and horizontal deflecting elements and an intensity control grid for varying the intensity and even blocking the cathode ray beam, said vertical elements being connected to said stationary magnetic pick up means, said intensity control grid being so connected as to be controlled by said series of impulses and to periodically vary the intensity of the image on the cathode ray screen, a light source, a photocell, a cam shaped member mechanically coupled to the test piece for varying the effects of said light source on said photocell and means for converting these effects into voltage variations and for applying said voltage variations to the other pair of deflecting elements to form a sweep circuit for said cathode ray indicating device.

8. An inspection device for indicating the values and locations of magnetic properties of a rotatable test piece comprising means for rotating the test piece, stationary magnetic pick up means for converting changes of magnetic intensity along the periphery of the test piece into electrical impulses, means including a photocell, a light source and a disc having a plurality of holes along its periphery for successively interrupting a beam of light from said photocell to said light source which disc is mechanically coupled to the test piece for creating a series of impulses, electrical detecting means including a cathode ray indicating device having two pairs of deflecting elements at right angles to each other, namely, vertical and horizontal deflecting plates and an intensity control grid for varying the intensity and even blocking the cathode ray beam, said vertical deflecting elements being connected to said stationary magnetic pick up means, said intensity control grid being so connected as to be controlled by said series of impulses and to periodically vary the intensity of the image on the cathode ray screen, a light source, a photocell, a cam shaped member mechanically coupled to the test piece for varying the effects of said light source on said photocell and means for converting these effects into voltage variations and for applying said voltage variations to the other pair of deflecting elements to form a sweep circuit for said cathode ray indicating device.

9. An inspection device for indicating the values and locations of irregularities or a periphery of a rotatable test piece comprising means for rotating the test piece, stationary pick up means for converting said irregularities into magnetic impulses, means mechanically coupled to the test piece for creating a series of impulses, electrical detecting means including a cathode ray indicating device having two pairs of deflecting elements at right angles to each other and switching means for selectively impressing either of said impulses on a cathode ray screen through one of said pairs of deflecting elements, a light source, a photocell, a cam shaped member mechanically coupled to the test piece for varying the effects of said light source on said photocell and means for converting these effects into voltage variations and for applying said voltage variations to the other pair of deflecting elements to form a sweep circuit for said cathode ray indicating device.

10. An inspection device for indicating the values and locations of irregularities in a periphery of a rotatable test piece comprising means for rotating the test piece, cathode ray indicating means having a pair of vertical deflecting plates, means for impressing a potential on said plates modulated by the amount and location of said irregularities, said cathode ray means also having a pair of horizontal deflecting elements, a light source, a photocell, a cam shaped member coupled to the rotatable test piece for varying the amount of light falling on said photocell, a variable voltage source which is modulated in accordance with said light variations, said variable voltage source being connected to said horizontal deflecting elements thereby synchronizing the sweep circuit with said cam shaped member.

CLIFTON S. WILLIAMS.